June 16, 1936. S. A. STAEGE 2,044,131
TRANSPARENCY METER
Filed June 27, 1933 2 Sheets-Sheet 1
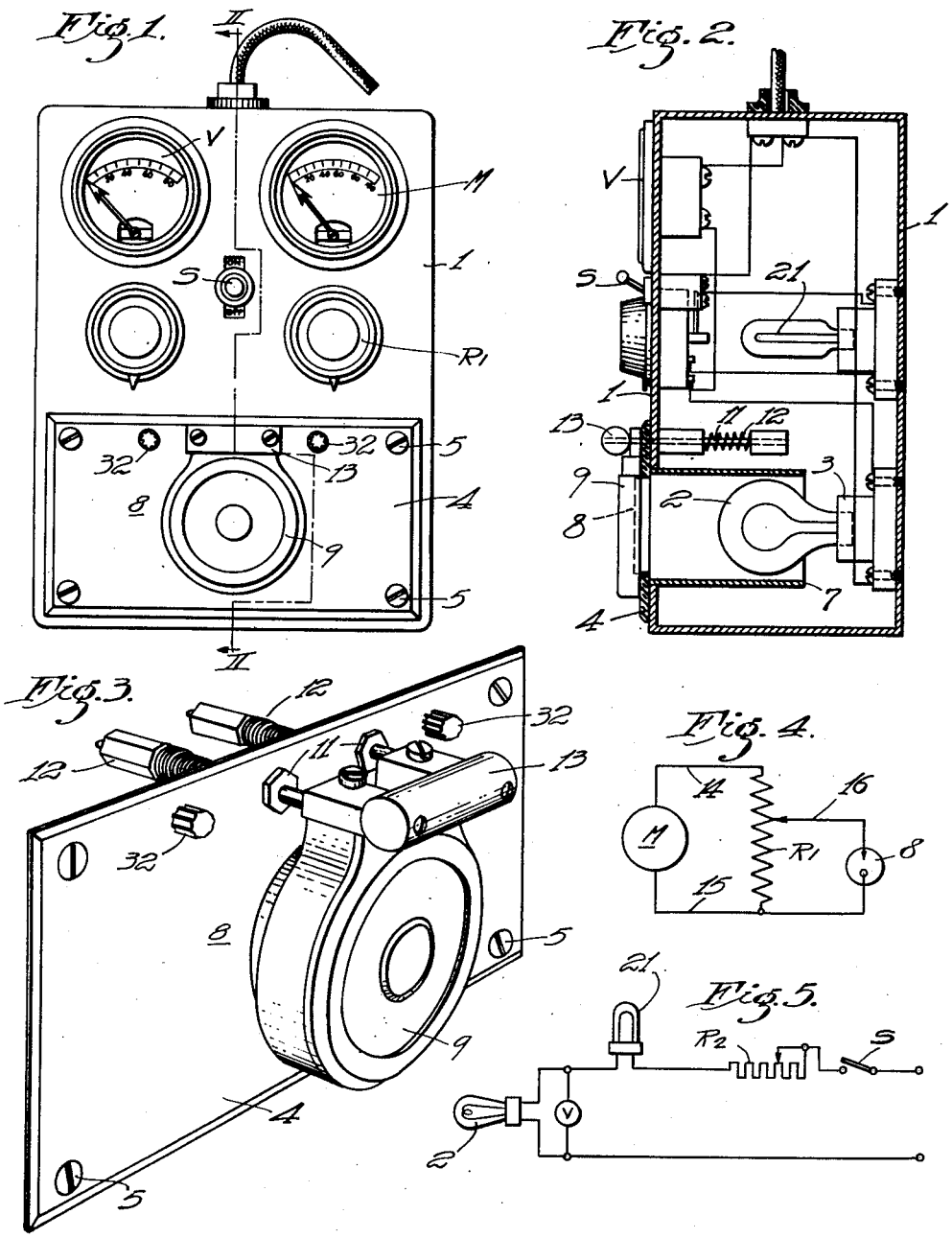
WITNESSES:
E. E. Leiding
F. J. Hicks
INVENTOR
Stephen A. Staege.
BY
ATTORNEY

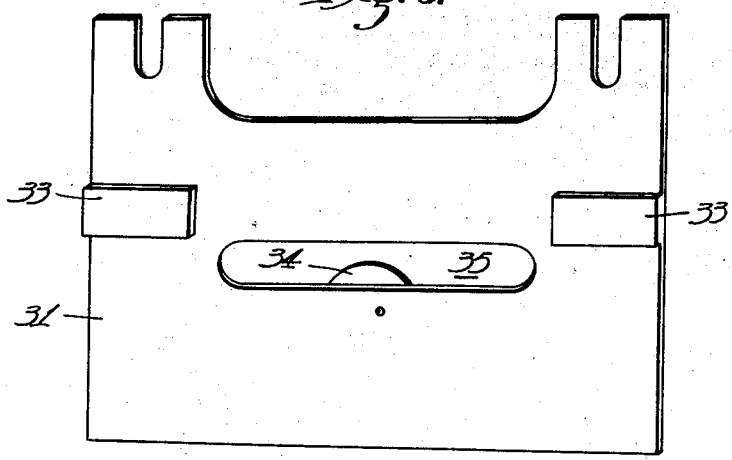
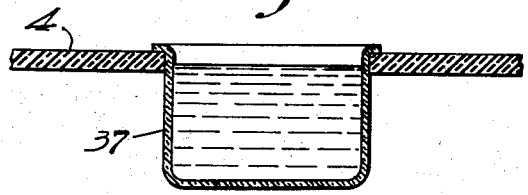
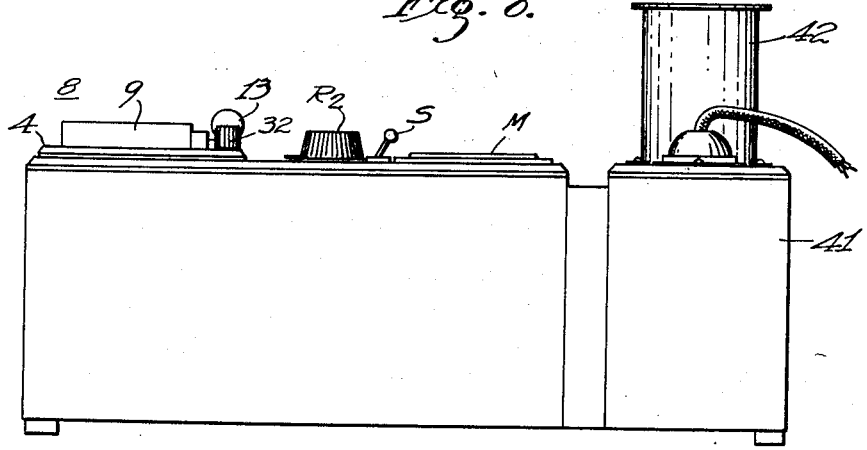

Patented June 16, 1936

2,044,131

UNITED STATES PATENT OFFICE 2,044,131

TRANSPARENCY METER

Stephen A. Staege, Pittsburgh, Pa., assignor to Westinghouse Electric & Manufacturing Company, East Pittsburgh, Pa., a corporation of Pennsylvania Application June 27, 1933, Serial No. 677,864

4 Claims. (Cl. 88—14)

My invention pertains to a device for measuring the thickness of a thin web of material and more particularly it pertains to a meter for indicating the thickness of paper in terms of its transparency to light.

It is an object of my invention to provide a device for indicating the thickness of a thin web in terms of its relative transparency, or light transmittancy. By "transmittancy" is meant the total percentage of light from a standard source which is transmitted by an area of the web of given dimensions, regardless of the color of the transmitted light.

It is a further object of my invention to provide a device which will accurately indicate the relative transmittancy of a thin web irrespective of its color or surface reflecting characteristics, and uninfluenced by voltage variations.

It is also an object of my invention to provide a transmittancy meter which may be readily adjusted and recalibrated.

Another object of my invention is to provide a transmittancy meter which will provide accurate indications of the average transmittancy or thickness of a moving paper web uninfluenced by the transparency variations over minute mottled areas.

A further object of my invention is to provide a simple compact transmittancy meter which may be conveniently used for measuring the transmittancy or thickness of either a moving paper web or the margin of a printed page.

The invention itself, however, both as to its organization and its method of operation, together with additional objects and advantages thereof, will best be understood from the following description of a specific embodiment, when read in connection with the accompanying drawings in which:

Figure 1 is a plan view of an embodiment of my invention;

Fig. 2 is a sectional view taken on the line II—II thereof;

Fig. 3 is a perspective view of the photocell with its mounting bracket and panel;

Fig. 4 is a diagrammatic view representing the instrument circuits and calibrating means;

Fig. 5 is a similar view of the lamp with its associated circuits;

Fig. 6 is a perspective view showing a mask for marginal testing on printed pages.

Fig. 7 is a sectional view showing a glass cup which is inserted in the opening in the panel for making turbidity measurements; and Fig. 8 is a side elevational view of a modified form of my device.

Referring more particularly to the drawings the apparatus comprises a sheet steel casing 1 which encloses and supports a source of light 2 which is preferably a 32 volt incandescent nitrogen filled lamp. The lamp is mounted on the bottom of the casing in a conventional socket 3 and a bulb which is frosted inside is used so that the light is diffused and uniformly distributed.

The upper wall of the lamp case is also preferably of steel except a portion over the lamp which is closed by a panel 4 of some phenolic condensation product. The panel 4 is removably secured to the casing by suitable screws 5 to afford convenient access thereto. A circular opening about two inches in diameter, is provided in the panel directly above the lamp bulb for projecting a beam of light upon the web of paper to be tested. A cylindrical partition wall 7 projects from the lower side of the panel 4 into the casing 1 and encloses the lamp 2, thereby forming a light chamber separate from the casing. All the light-exposed surfaces are made a dead black to prevent variations of the intensity of illumination by reflected light.

A photo-cell 8 preferably of the voltaic copper oxide type, is supported on the panel above the light projecting opening. The photo-cell is a flat round copper oxide disk, suitably sensitized by heat treatment, and provided with a layer of sputtered silver or gold as set forth in detail in copending application Serial No. 578,399 filed by Earl DeWitt Wilson, December 1, 1931. This light responsive element is sensitive to the various colors in substantially the same degree as the eye, hence no filters are required and both white and colored samples produce substantially the same proportionate degree of response in the device as in the eye. It has an instantaneous and reliable response, does not suffer fatigue, and generates a voltage according to the amount of light striking it.

The flat light sensitive element is enclosed in a compact moulded receptacle 9 of relatively flat circular formation which is mounted on guide pins 11 extending slidably through the panel 4. Compression springs 12 (Fig. 2), concentrically disposed on the lowermost ends of the pins, normally bias the flat photo-cell receptacle 9 downwardly into firm contact with the panel 4 and thereby hold the flat light sensitive element adjacent the entire surface of paper to be tested. A handle 13 is provided on the photo-cell casing for convenience in lifting the photo-cell to insert a piece of paper between it and the panel for testing.

The light-exposed surfaces of the photo-cell receptacle 9 are light reflecting in order that all the light passing through the paper sheet will be collected and thrown onto the photo-cell 8. Since the light sensitive element is flat and is supported adjacent the entire area of paper to be tested and the outer rim of the receptacle 9 is held in firm contact with the paper all extraneous light is shut off. Hence, practically all the light which impinges upon the photo-cell is that which passes through the paper from the constant light source.

Light which is reflected toward the lamp is absorbed by the black walls of the light chamber 7 and does not raise the general level of illumination. Therefore, a sheet having a dull finish on one side and a glossy finish on the other will give the same transmittancy readings no matter which side is placed toward the light.

A microammeter M, which is mounted in the upper wall of the casing 1 is connected directly to the photo-cell 8 and preferably has a full scale reading of 100 which corresponds to one hundred per cent transmittancy. For adjusting the deflection of the instrument, a potentiometer resistor R1 of about 200 ohms, having an adjustable slider is also mounted on the casing. As shown in Fig. 4, the terminals of the resistor R1 are connected by suitable conductors 14 and 15 directly to the terminals of the microammeter thereby providing for a degree of damping which is useful in obtaining smooth average readings when testing a moving paper web. One terminal of the photo-cell 8 is connected directly to one terminal of the resistor and the other terminal is connected by a suitable conductor 16 to the slider whereby the photo-cell 8 may be adjustably connected across varying portions of the resistor R1 by turning the potentiometer knob on the casing. Since the copper oxide photo-cell 8 generates its own current an external source of current in the measuring circuit is unnecessary.

I have found that it is essential to provide a good voltage regulator in combination in my device to insure constant illumination of the lamp since the voltage fluctuations usually experienced on ordinary service lines cause comparatively large fluctuations of the intensity of illumination and the color spectrum of the light. For this purpose I provide a voltage regulator having no moving parts, such as the tube type ballast resistor 21, with iron wire in hydrogen, which is connected in series with the lamp 2, as shown in Fig. 5.

A manually adjustable resistor R2 is also connected in series with the lamp 2 to provide suitable adjustment for different systems or for alternating current and direct current operation. A voltmeter V, which is mounted on the upper wall of the casing, is connected in parallel with the lamp to enable the operator to initially adjust the lamp voltage when the device is plugged into any system. After proper preliminary adjustment the voltage is automatically regulated by the ballast resistor 21. A suitable toggle switch S mounted on the casing is connected in series in the lamp circuit, as diagrammatically represented in Fig. 5.

After the instrument is plugged in, and the switch S turned on, it is adjusted for operation by turning the potentiometer knob until the meter indicates 100 while the full intensity of illumination is received by the cell. When a sheet of paper is then inserted, the transparency is indicated directly in percentage. The area of the paper under observation is approximately three square inches which is sufficiently large to obtain an indication which is an average indication uninfluenced by small spots of high transparency or opacity due to mottling effect in the sheet formation.

When the device is used with a moving web of paper the pointer of the microammeter M remains fairly steady at the average reading and it is unnecessary to try to estimate the average position of a rapidly vibrating pointer. In actual use, the two inch circular test area is small enough to pick out streaks in the sheet or other non-uniform conditions which it is desired to detect.

The mask 31 shown in Fig. 6 may be secured in position on the panel 4 by the thumb screws 32 provided thereon and the area of the light projecting opening thereby reduced to a strip approximately two inches long by half an inch wide, for testing the margin of a printed page, which is often of great convenience. Guide stops 33 on the mask 31 guide the position of the printed page and prevent insertion too far under the photo-cell. A shutter member 34 is provided adjacent one edge of the slot 35 in the mask. By adjusting the position of the pivoted member 34 the effective area of the slot may be accurately adjusted to a precise ratio such for example as one fourth the total circular area. After the mask is inserted it is then necessary to readjust the microammeter M for full scale deflection at full illumination, by turning the potentiometer knob on the panel.

Although it is generally desirable to adjust the instrument for the full scale deflection at 100 with full intensity of illumination on the cell in order that the readings of percentage transmittancy may be obtained directly from the meter, it is advantageous, when testing very heavy paper, to employ a different method. By first inserting the heavy paper sample the potentiometer R1 may then be adjusted for maximum sensitivity which is four times greater than that used when ordinary paper is tested. A greater deflection will then be obtained and the transmittancy may be computed.

To measure the turbidity of liquids, a glass cup 37 may be inserted in the opening in the panel 4, under the photo-cell as shown in Fig. 7. Predetermined quantities of various liquids may then be measured into the cup 37, and the readings from the microammeter will indicate their relative turbidity. By using a flat plate my device may also be conveniently utilized to make atmospheric precipitation tests. By weighing the precipitate a few times the weights corresponding to various transmittancy readings are ascertained and thereafter it is only necessary to insert the plates and observe the microammeter readings.

In Fig. 8 I have shown an embodiment of my invention in which two separate casings are provided. An auxiliary casing 41 supports the ballast resistor 21 and the manually adjustable resistor R2 for controlling the lamp. In this embodiment the more sensitive elements of the system such as the microammeter M are not exposed to the heat generated by the $I^2R$ losses in the lamp resistors. The ballast resistor tube is preferably mounted upon the upper panel of the auxiliary casing 41 and is provided with a suitable protective shield 42. In this embodiment the entire upper panels of the casings may be made of a suitable phenolic condensation product.

It will be seen that I have provided a device which will give accurate measurements of the percentage transparency of various materials, liquids or solids, moving or stationary, white or colored by the simple direct reading of a meter, and which is not materially affected by extraneous light, by different surface finishes, by voltage fluctuations or by minute spots of high transparency or opacity due to the mottling effect in paper.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In apparatus for measuring the light transmission characteristics of a web, a first enclosure having a light transmitting aperture therein for supplying light to an area of the web, a source of light in said enclosure, said enclosure having light-absorbent internal surfaces and having parts arranged to exclude external light from said area, a second enclosure having a light-receiving aperture therein registering with said first-mentioned aperture, a light-responsive element in said second enclosure, said second enclosure having non-absorbent internal surfaces and having parts arranged to exclude external light, said enclosures having matched surfaces surrounding said apertures for engaging said web, guide means mechanically connecting said enclosures for insuring rectilinear movement thereof into registering engagement, and means for biasing said enclosures into engagement with said web, whereby the degree of illumination of said area from said source is substantially independent of the color or surface finish of said web and said light-responsive element is illuminated to a maximum degree for a given amount of light transmitted through said web.

2. In apparatus for measuring the light transmission characteristics of a web, a source of light, a light-responsive element positioned to be influenced by light from said source transmitted through the web, a two-part enclosure having a part containing said source and a part containing said element, the two parts of said enclosure having matched enclosing surfaces for engagement in a plane, said surfaces being provided with registering apertures for the transmission of light, guide means mechanically connecting said parts for insuring rectilinear movement thereof into engagement on said surfaces, and means for biasing said parts into engagement on said surfaces, whereby the web may be engaged between said parts of said enclosure in such manner as to exclude all extraneous light.

3. In apparatus for measuring the light transmission characteristics of a web, a source of light, a light-responsive element positioned to be influenced by light from said source transmitted through the web, a two-part enclosure having a part containing said source and a part containing said element, the two parts of said enclosure having matched enclosing surfaces for engagement in a plane, said surfaces being provided with registering apertures for the transmission of light, guide means for limiting relative movement of the parts of said enclosure to translation along an axis perpendicular to said surfaces, and means for biasing said parts into engagement on said surfaces, whereby the web may be engaged between said parts of said enclosure in such manner as to exclude all extraneous light, and the biasing pressure is distributed over said surfaces.

4. In apparatus for measuring the light transmission characteristics of a web, a source of light, a light responsive element positioned to be influenced by light from said source transmitted through the web, a two-part enclosure having a part containing said source and a part containing said element, the two parts of said enclosure having matched enclosing surfaces for engagement in a plane, a removably mounted flat accessory having substantially parallel surfaces suitable to be engaged in light-excluding relationship by said enclosing surfaces, and means for biasing said parts of said enclosure into engagement on said enclosing surfaces, whereby the web may be engaged between said parts of said enclosure in such manner as to exclude external light, either separately or together with said flat accessory.

STEPHEN A. STAEGE.